(12) United States Patent
Hahn et al.

(10) Patent No.: US 6,739,644 B2
(45) Date of Patent: May 25, 2004

(54) CONTAINMENT FOR RECEIVING A REMOVABLE VEHICLE TOP

(75) Inventors: Gerald Hahn, Hamburg (DE); Christian Holst, Hamburg (DE); Bernd Roschat, Nordermeldorf (DE)

(73) Assignee: CTS-Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/429,547

(22) Filed: May 5, 2003

(65) Prior Publication Data
US 2003/0189355 A1 Oct. 9, 2003

Related U.S. Application Data

(63) Continuation-in-part of application No. PCT/EP02/08714, filed on Aug. 5, 2002.

(30) Foreign Application Priority Data

Aug. 9, 2001 (DE) .......................................... 101 38 163

(51) Int. Cl.$^7$ ................................................. B60J 7/20
(52) U.S. Cl. ............................... 296/107.08; 296/37.1; 296/76; 296/136.06
(58) Field of Search .......................... 296/107.08, 76, 296/37.1, 37.5, 37.8, 37.16, 136.06

(56) References Cited

U.S. PATENT DOCUMENTS

| | | | | |
|---|---|---|---|---|
| 4,819,982 A | * | 4/1989 | Eyb ...................... 296/107.17 |
| 4,969,679 A | * | 11/1990 | Eyb ............................ 296/124 |
| 5,649,733 A | * | 7/1997 | Seel et al. .................. 296/37.5 |
| 5,810,413 A | * | 9/1998 | Siring et al. ................ 296/37.5 |
| 6,390,532 B1 | * | 5/2002 | Mac Farland .......... 296/107.17 |
| 6,419,308 B1 | * | 7/2002 | Corder et al. .......... 296/216.02 |
| 6,422,637 B1 | * | 7/2002 | Mac Farland .......... 296/107.15 |
| 6,425,621 B2 | * | 7/2002 | Miklosi et al. ............. 296/108 |
| 6,557,921 B2 | * | 5/2003 | Wezyk et al. .......... 296/107.07 |
| 6,582,009 B2 | * | 6/2003 | Wezyk et al. ............. 296/180.1 |

FOREIGN PATENT DOCUMENTS

| | | |
|---|---|---|
| DE | 38 29 346 | 3/1990 |
| DE | 197 12 967 | 10/1998 |
| DE | 197 23 328 | 12/1998 |
| DE | 298 09 006 | 3/1999 |
| DE | 298 09 007 | 6/1999 |
| DE | 198 34 850 | 2/2000 |
| FR | 0 796 901 | 2/2001 |

* cited by examiner

Primary Examiner—D. Glenn Dayoan
Assistant Examiner—Gregory A Blankenship
(74) Attorney, Agent, or Firm—Klaus J. Bach

(57) ABSTRACT

In a containment for receiving a removable vehicle top, including a containment cover, a containment cover operating mechanism for transferring the vehicle top between closed and open positions, a containment bottom movable between raised and lowered positions and a containment bottom operating mechanism, the containment bottom operating mechanism is coupled to the vehicle top in such a way that, during the transfer of the vehicle top from the closed to the open position, movement of a component of the vehicle top initiates the lowering of the containment bottom by uncoupling the containment bottom from its operating mechanism before the vehicle top enters the containment.

14 Claims, 4 Drawing Sheets

CONTAINMENT FOR RECEIVING A REMOVABLE VEHICLE TOP

This is a Continuation-in-Part application of international patent application PCT/EP02/08714 filed Aug. 5, 2002, and claiming the priority of German Application 101 38 163.8 filed Aug. 9, 2001.

BACKGROUND OF THE INVENTION

The invention resides in a containment for receiving a removable vehicle top, including a containment cover, which can be opened for the transfer of the vehicle top between closed and open positions by way of a cover operating mechanism and a containment bottom, which is movable by a containment bottom operating mechanism between a raised position corresponding to a position of the vehicle top in which it is closed and a lowered position corresponding to an open position of the vehicle top.

DE 197 12 967 A1 discloses a vehicle top containment, which is disposed immediately behind the vehicle interior and which is adapted to receive a removable vehicle top for opening the vehicle interior. The vehicle top containment is provided with a cover, which can be opened to provide access to the containment. The vehicle top containment forms an independent storage space separate from the vehicle trunk. This however reduces the available trunk space even when the vehicle top is closed and the vehicle top containment is empty.

DE 198 34 850 A1 discloses a top containment for accommodating a removable vehicle top with an adjustable containment bottom which is movable between a raised and a lowered position. The raised position corresponds to a state in which the vehicle top is closed and the lowered position is assumed by the containment bottom when the vehicle top is open that is it is deposited in the containment. In the raised position of the containment bottom, the usable trunk space is substantially increased. For raising and lowering the bottom, a containment bottom operating mechanism is provided which is part of the vehicle top operating mechanism. In this way, the movement of the vehicle top and the lowering and raising of the containment bottom are coupled.

The arrangement disclosed in DE 198 34 850 A1, however, has the disadvantage that the containment bottom reaches its lowered position, in which the top containment has the largest volume, only at the end of the movement of the vehicle top into the containment. As a result, the containment must be relatively large since during the continuous movement of the vehicle top into the storage containment a large part of the vehicle top must be accommodated in the containment already before the end of the movement of the top into the containment. The lowering movement of the bottom, which is coupled to the continuous movement of the vehicle top, requires sufficient space whereby the freely usable trunk space is limited.

A vehicle top containment with a containment floor that can be lowered is disclosed also in DE 298 09 007 U1. However, a coupling of the containment bottom operating mechanism with the vehicle top operating mechanism is not disclosed in this publication. The vertical movement of the containment bottom is achieved by means of a cable winch whose operation can be initiated remotely from the dashboard or which is actuated by way of a control element that is operated during opening of the top and its closing or during opening and closing of the containment cover. There is no direct coupling between the vehicle top operating mechanism and the containment bottom operating mechanism.

It is the object of the present invention to provide a containment for accommodating a vehicle roof when the vehicle roof is opened and a relatively large trunk space for accommodating luggage when the vehicle roof is closed.

SUMMARY OF THE INVENTION

In a containment for receiving a removable vehicle top, including a containment cover, a containment cover operating mechanism for transferring the vehicle top between closed and open positions, a containment bottom movable between raised and lowered positions and a containment bottom operating mechanism, the containment bottom operating mechanism is coupled to the vehicle top in such a way that, during the transfer of the vehicle top from the closed to the open position, movement of a component of the vehicle top initiates the lowering of the containment bottom by uncoupling the containment bottom from its operating mechanism before the vehicle top enters the containment.

The bottom of the vehicle top containment includes a containment bottom operating mechanism, which permits movement of the containment bottom between a raised position corresponding to a closed position of the vehicle top and a lowered position corresponding to an open position of the vehicle top in which the vehicle top is deposited in the containment. In the raised position of the containment bottom, the trunk space is essentially not affected by the containment, whereby the maximum storage volume of the trunk is provided. For depositing the vehicle top in the vehicle top containment, the containment bottom is lowered in order to provide the storage space needed for the vehicle top.

The containment bottom operating mechanism by way of which the containment bottom is lowered and raised is coupled with the vehicle top in such a way that, during the transfer of the vehicle top from the closed to the open position, the containment bottom is automatically lowered. Also, the containment bottom can be uncoupled from the containment bottom operating mechanism.

This makes it possible that the containment bottom is lowered at the beginning of the opening movement of the vehicle top and to provide in this way a sufficiently large storage space in the containment early during the opening movement of the vehicle top for the accommodation of the vehicle top as the bottom is lowered at the start of the opening movement of the vehicle top. When the containment bottom has been lowered, it is uncoupled from the containment bottom operating mechanism so that the operating mechanism can continue to move—since it is coupled to the vehicle top—and the opening movement of the vehicle top can continue without transmitting that movement to the containment bottom which remains in its lowered position independently of any further movement of the containment bottom operating mechanism.

The lowering of the containment bottom early in the movement process for opening the vehicle top furthermore has the advantage that the opening movement can be interrupted at an early stage when the top has not been moved yet into the storage containment if an object is in the vehicle trunk which blocks the lowering movement of the containment bottom. The same applies to the cover of the top containment, which may remain closed until the containment bottom is in its lowered position.

For the closing of the vehicle top, the procedure is reversed. First, the containment bottom operating mechanism and the containment bottom remain uncoupled so that the containment bottom remains lowered while the vehicle top is lifted out of the storage position in the containment. In the last movement phase of the closing procedure of the vehicle top, the containment bottom operating mechanism is again coupled to the containment bottom so as to lift the containment bottom to its raised position in which it extends into the vehicle trunk only to a small extent.

The coupling between the containment bottom operating mechanism and the vehicle top has the advantage that no separate drive is necessary for the raising and lowering of the containment bottom. The lowering of the containment bottom is furthermore supported by the weight of the containment bottom.

Expediently, the uncoupling of the containment bottom operating mechanism and the containment bottom depends on the opening movement of the containment cover. The containment cover closing the vehicle top containment must be open during the transfer of the vehicle top between the closed and open positions to permit access to the vehicle top containment. The opening movement may be utilized for the uncoupling of the containment bottom operating mechanism and the containment bottom. After the containment bottom has been uncoupled from its operating mechanism, the containment bottom remains in the lowered position independently of the further movement of the vehicle top. Upon closing of the containment cover, the containment bottom and its operating mechanism are again coupled together.

The containment bottom operating mechanism and the containment bottom are preferably pivotally joined and the operating mechanism can be locked to the containment bottom by a removable locking bolt such that no relative degree of freedom exists between the operating mechanism and the containment bottom and any movement transferred from the vehicle top to containment bottom operating mechanism is directly transmitted to the containment bottom. In the uncoupled state, the locking bolt interconnecting the containment operating mechanism and the containment bottom is retracted, so that the components are unlocked and the containment bottom operating mechanism can pivot about its pivot axis relative to the containment bottom. Further movement of the vehicle top will therefore result in a movement of the containment bottom operating mechanism, but this movement will not be transferred to the containment bottom.

For the transfer of the opening movement of the containment cover to provide for an uncoupling movement of the locking bolt, there is preferably provided between the containment cover and the locking bolt a transfer member, particularly on operating cable, which converts the movement of the containment cover into a retraction movement of the locking bolt so as to move it out of its locking position. In this embodiment, the containment bottom movement is affected by the movement of two parts: firstly, by the movement of the vehicle top during the transfer between the closed and the open position thereof and secondly, by the movement of the containment cover upon opening of the containment cover. These two movements are preferably timely tuned such that, if in its closed position the vehicle top is disposed on the containment cover and therefore blocks movement of the containment cover, the vehicle top is first raised to permit the opening of the containment cover.

Preferably, the containment bottom is supported pivotally about a stationary transverse pivot axis and extends in its raised position about vertically within the vehicle and about horizontally in its lowered position. The containment bottom operating mechanism may be biased into the lowered position of the containment bottom, particularly by the weight of the containment bottom and/or by a spring element.

For the transfer and conversion of the movement of the vehicle top to the lowering movement of the containment bottom, an operating arm may be pivotally supported on the vehicle body and linked to the containment bottom operating mechanism. Preferably, an operating member is connected with one end to the operating arm and with its other end to a movable part of the vehicle top and holds the containment bottom in a raised position against the biasing spring or weight force when the vehicle top is closed. The operating member is for example a Bowden cable.

The invention and its advantage will be described below in greater detail on the basis of the accompanying drawings.

DESCRIPTION OF A PREFERRED EMBODIMENTS

Figure 1A:
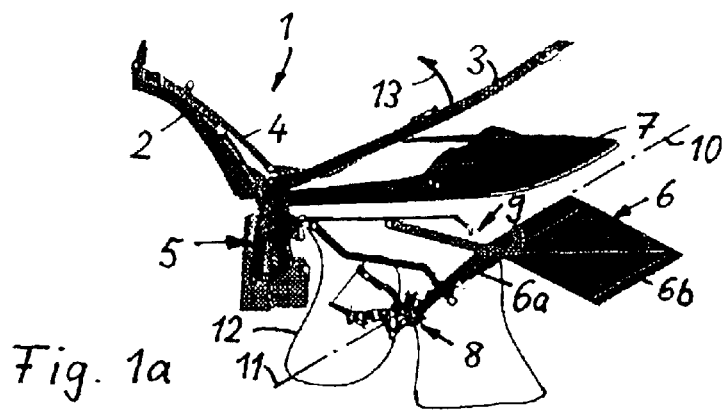
FIGS. 1a–1d are perspective views of a removable vehicle top and a top containment with a containment bottom and a containment cover in different positions during the transfer of the cover between a closed and an open position.

In the following description identical components are designated by the same reference numerals.

Referring to FIGS. 1a–1d, the basic phases of the movement of the vehicle top and the containment bottom and cover during movement of the vehicle top between the closed and the open positions thereof are first described.

The vehicle top is, in the shown embodiment, a soft-top with a linkage consisting of a plurality of linkage components and a top cover canvas material supported by the linkage components. However, in the alternative also a hardtop may be employed.

FIGS. 1a to 1d, show a top operating mechanism 5 with a main arm 2 and a rear tensioning yoke 3. The tensioning yoke 3 is disposed in a closed position of the vehicle top on the containment cover or, respectively, the trunk lid and provides for the needed tensioning of the cover canvas. The tensioning rod 3 is held in the closed position by a linkage 4. The whole top support linkage is movable between the closed and open positions thereof by means of the top operating mechanism 5.

In its open position, the vehicle top 1 is deposited in a vehicle top containment, which is disposed just behind the vehicle interior and of which a containment bottom 6, a containment cover 7 and an operating mechanism consisting of a containment bottom operating mechanism 8 and a containment cover operating 9 are shown in the drawings. The containment bottom 6 comprises expediently two parts, a first bottom part 6a and a second bottom part 6b which two parts are pivotally joined so as to be pivotable relative to each other about a pivot axis 10, which extends transverse to the longitudinal vehicle direction. The containment bottom 6 is supported by its first part 6a in the area of the containment bottom operating mechanism 8 so as to be pivotable about a pivot axis 11, which is stationary with respect to the vehicle body and which also extends transverse to the longitudinal vehicle axis. The two bottom parts 6a, 6b of the containment bottom are in the lowered position of the containment bottom 6 both approximately in a horizontal orientation.

Figure 1B:
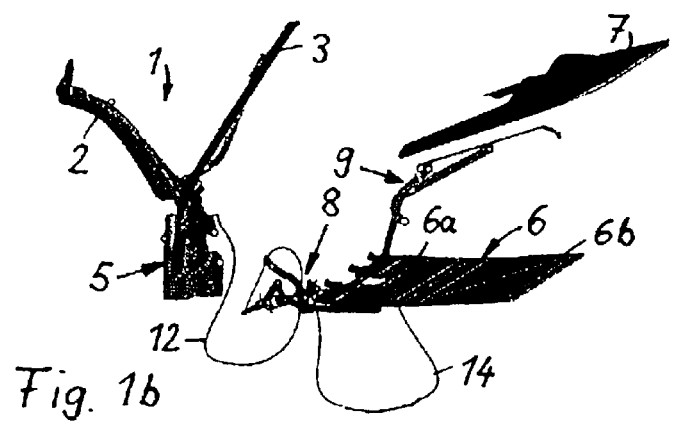
Figure 1C:
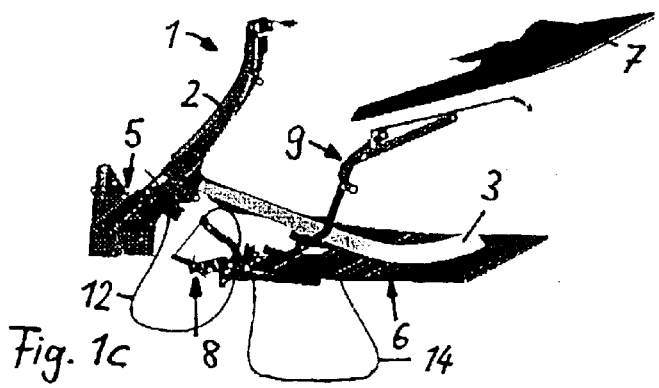
Figure 1D:
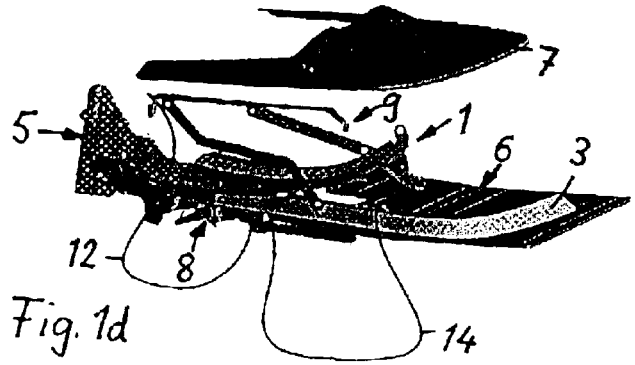

The containment bottom operating mechanism facilitates the lowering of the containment bottom 6 from the raised upright position corresponding to a closed position of the vehicle top 1 to the lowered horizontal position as shown in FIGS. 1b to 1d, in which the containment bottom 6 is lowered into the trunk of the vehicle, so that the top 1 can be accommodated in the top containment.

In FIG. 1a, the containment bottom 6 is shown in an intermediate position between the raised and the lowered positions. In the raised position, the first bottom part 6a, which is directly coupled to the containment bottom operating mechanism 8, is expediently in an essentially vertical position. The second bottom part 6b is pivoted relative to the first bottom part 6a about its pivot axis 10 by 180° so that both bottom parts 6a and 6b are arranged vertically in a side-by-side relationship.

Figure 2:
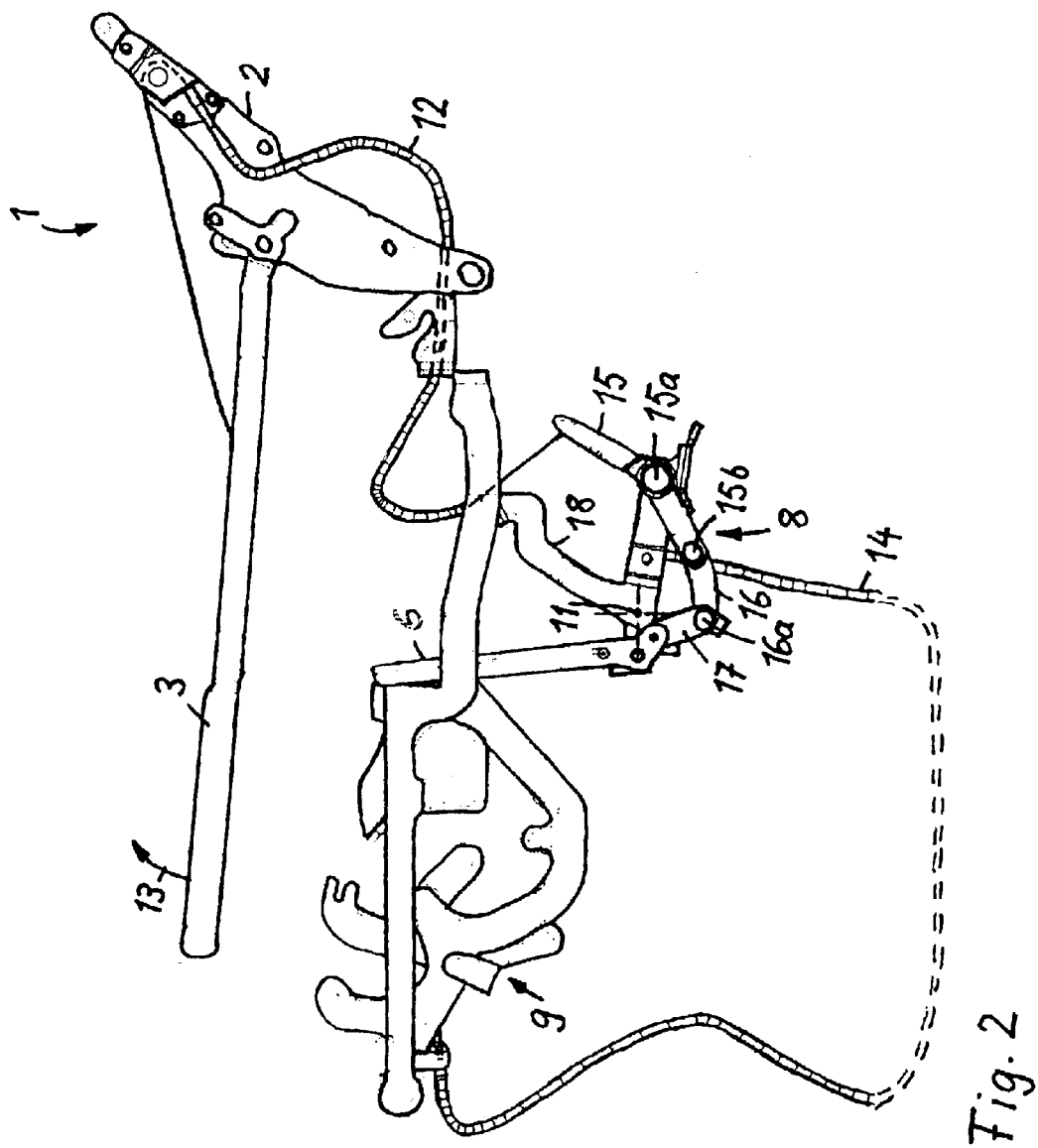
FIG. 2 is a side view showing the operating mechanism for the vehicle top and the vehicle top containment.

For the transfer movement of the containment bottom 6 between its raised and lowered positions, the containment bottom operating mechanism is coupled to the vehicle top operating mechanism. To this end, an operating member in the form of a Bowden cable 12 extends between a component of the vehicle top 1 or, respectively, the vehicle top operating mechanism 5 and the containment bottom operating mechanism 8. The operating member 12 initiates the lowering of the containment bottom 6 at the beginning of the opening movement. In its raised position, the containment bottom is biased toward its lowered end position but is retained in the raised position by the Bowden cable 12 when the vehicle top 1 is closed. In addition, a stretched position between two components of the containment operating mechanism 8 as shown in FIG. 2 may stabilize the raised position of the containment bottom.

The Bowden cable 12 is expediently coupled to the tensioning cable yoke 3 for movement therewith such that a raising of the tensioning yoke 3 from its position on the top containment cover 7 forwardly in the direction of the arrow 13 releases the tension in the Bowden cable 12 or reduces it, whereby the containment bottom 6 and the containment bottom operating mechanism 8 are pivoted about the pivot axis 11 and lowered as a result of the biasing force effective on the containment bottom. The containment bottom 6 reaches its lowered end position as soon as the tensioning yoke 3 reaches the vertical position as shown in FIG. 1b. In this position, particularly the main arm 2 as well as the linkage components connected thereto and a large part of the top-canvas are still in the closed-top position.

After the transfer of the tensioning yoke 3 to the upright position with a concurrent lowering of the containment bottom 6, the top containment cover 7 is transferred by operation of the top containment cover operating mechanism 9 from its closed position in which it covers the top containment to an open position in which it provides access to the top containment. The top containment cover 7 or, respectively, the top containment cover operating mechanism 9 are coupled by another Bowden cable 14, which acts as a movement transfer member, to a locking structure, by way of which the containment bottom operating mechanism 8 can be locked to the containment bottom 6 so as to prevent relative movement between these components. The containment bottom operating mechanism 8 is pivotally supported on the containment bottom 6 and, for the transfer between the raised and lowered positions of the containment bottom, firmly connected to the containment bottom by means of the locking structure. In this way, the operating movement transmitted by the first Bowden cable 12 resulting from the actuation of the tensioning yoke 3 is transferred directly to the containment bottom operating mechanism for pivoting the containment bottom between its raised and its lowered positions.

When now, by the movement of the top containment cover 7 and the transfer of that movement by way of the second Bowden cable 14, the locking structure is moved out of its locking state, the containment operating mechanism 8 can be pivoted about its pivot axis relative to the containment bottom 6. Because of the uncoupling, the movement of the containment bottom operating mechanism does not result in a movement of the containment bottom 6. Accordingly, movement of the Bowden cable does not affect the containment bottom 6, which remains in its lowered position over the remaining movement phase of the vehicle top 1.

In the intermediate position as shown in FIG. 1c, the tensioning yoke 3 is already deposited in the top containment on the containment bottom 6. The main arm 2 of the vehicle top 1 is pivoted backwardly toward the top containment about its pivot axis. The top containment cover 7 remains in the open position until all the components of the vehicle top 1 are deposited in the top containment.

FIG. 1d shows the vehicle top 1 in the open position in which the vehicle top 1 is deposited in the top containment. The top containment cover 7 is now again in the closed position. By the closing of the cover 7, the containment bottom operating mechanism is again coupled to the containment bottom 6. However, because of the stationary deposition of the vehicle top 1 in the containment this remains without any effect on the containment bottom 6.

During closing of the vehicle top, the procedure is reversed. First, the top containment cover 7 is opened so that the vehicle top can be lifted out of its storage position in the top containment. Upon opening of the top containment cover 7, the containment bottom operating mechanism 8 is uncoupled from the containment bottom. When the containment cover has been opened, the top operating mechanism 5 is actuated and the vehicle top 1 is lifted out of the top containment. This movement has no effect on the containment bottom because at this point, the containment bottom is uncoupled from the containment bottom operating mechanism. The containment bottom remains in its lowered position. When the vehicle top has reached its closed position, the containment cover 7 is again closed. Then also the locking structure between the containment bottom operating mechanism and the containment bottom is transferred to the locking position whereby the movement of the containment bottom operating mechanism is transferred directly to the containment bottom. Then the tensioning yoke 3 is moved from its raised position backwardly to the tensioning position in which the tensioning yoke is disposed on the top containment cover 7. This movement of the tensioning yoke 3 is transferred by the transfer element to the containment bottom operating mechanism which is moved thereby from its lowered position to the raised position.

As apparent from FIG. 2, the containment bottom operating mechanism 8, by way of which the containment bottom 6 is moved from the raised position shown to a lowered position consists of a drive arm 15, an intermediate link 16 and a containment bottom operating arm 17. By means of the arms 15, 17 and the link 16 the movement of the tensioning yoke 3 in the direction of the arrow 13 is transferred by way of the first Bowden cable 12 to the containment bottom 6 and the bottom 6 is released from the raised position. The containment bottom 6 can then be lowered by its weight or by spring forces acting thereon. The drive arm 15 is supported so as to be pivotable about a pivot axis 15a at one end of the yoke member 18, which is firmly connected to the vehicle body. The drive arm 15 is a double lever having opposite ends, with one end of the drive arm 15 being connected to the first Bowden cable 12 by way of which the lowering movement of the containment bottom 6 is controlled. At the opposite end of the drive arm 15 the intermediate link 16 is pivotally connected to the drive arm 15, which intermediate link 16 is supported so as to be pivotable about another pivot axis 15b. At the end opposite of the drive arm 15, the intermediate link 16 is connected pivotally to the containment bottom operating arm 17 at axis 16a. The containment bottom operating arm 17 is firmly connected to the containment bottom 6 when locked by the locking mechanism so that the containment bottom operating arm 17 and the containment bottom 6 perform the same pivot movement about the vehicle body-stationary pivot axis 11 of the containment bottom 6 during a transfer between the raised and lowered positions thereof.

In the raised position of the containment bottom 6 as shown in FIG. 2, which corresponds to the closed position of the vehicle top 1, the intermediate lever link 16 and the arm of the lever 15 connected thereto are essentially aligned. The raised position of the containment bottom is therefore stable so that the first Bowden cable is released from stresses, which could result from holding the containment bottom in the raised position.

Figure 3:
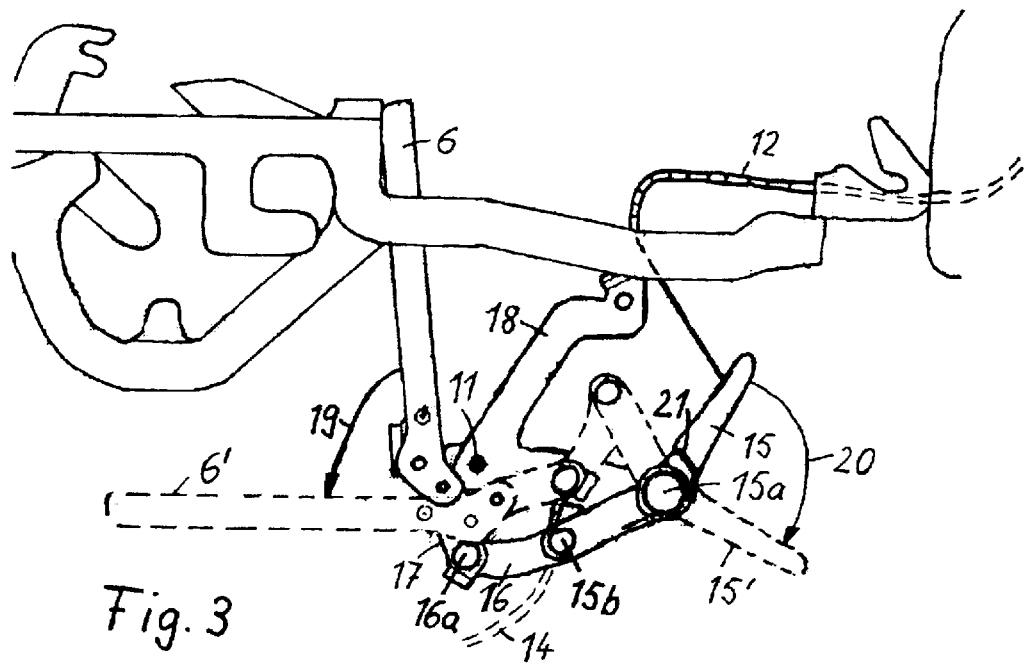
FIG. 3 is an enlarged view of the containment bottom operating mechanism.

In FIG. 3, the containment bottom is shown in the raised position (full lines) and, in dashed lines, also in the lowered position. In the lowered position, components are indicated by the respective numerals primed. The containment bottom 6 is to be pivoted about its pivot axis 11 in the direction of the arrow 19 from the raised to the lowered position. This pivot movement is initiated by a pivot movement of the drive arm 15 in the direction of the arrow 20, which is possible by the yielding of the Bowden cable 12 as a result of the upward movement of the tensioning yoke. The lowering of the containment bottom 6 can be initiated by a torsion leg spring 21 which engages the drive arm 15 and provides a torque about its pivot axis and also by the weight of the containment bottom.

Figure 4:
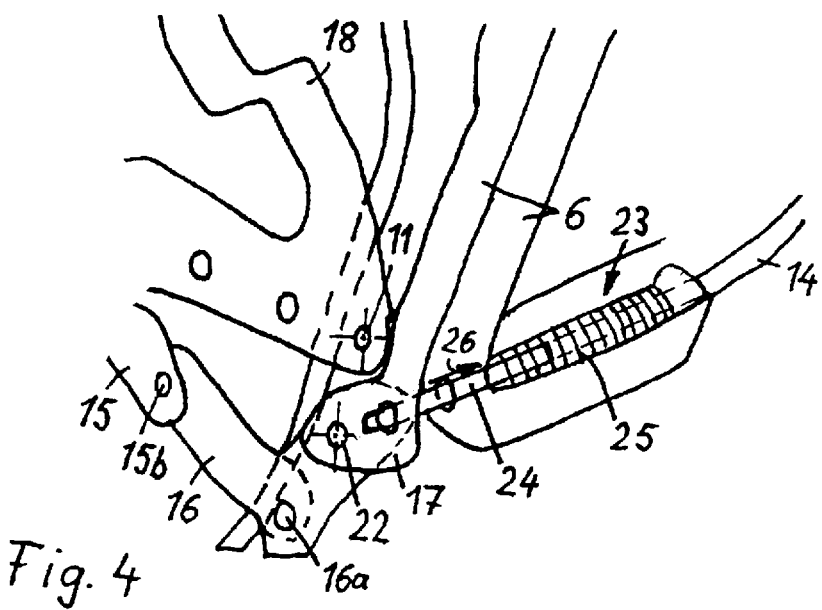
FIG. 4 is a perspective view of the containment bottom operating mechanism including a locking bolt disposed between the containment bottom and a component of the containment bottom operating mechanism.

FIG. 4 is a perspective representation of the containment bottom operating mechanism 8 showing the locking structure 23 for releasably interlocking the containment bottom operating mechanism 8 and the containment bottom 6. The locking structure 23 comprises a horizontally supported axially movable locking bolt 24, which is biased by a spring 25 into its locking position in which the locking bolt 24 which is supported on the containment bottom 6, lacks the containment bottom 6 to the containment bottom operating arm 17. The containment bottom operating arm 17 is pivotally connected to the containment bottom 6 by a pivot axis 2 about which the containment bottom 6 is freely pivotable when the locking bolts 24 is in a release position.

The spring 25 biases the locking bolt 24 into its locking position, in which a relative movement between the containment bottom 6 and the containment bottom operating arm 17 is prevented since any relative movement about the pivot axis 22 is prevented by the locking bolt 24 arranged in spaced relationship from the pivot axis 22. Upon actuation of the second Bowden cable 14, the locking bolt 24 is retracted from its locking position in the direction of the arrow 26, so that the containment bottom operating arm 17 can pivot relative to the containment bottom about its pivot axis 22.

Figure 5:
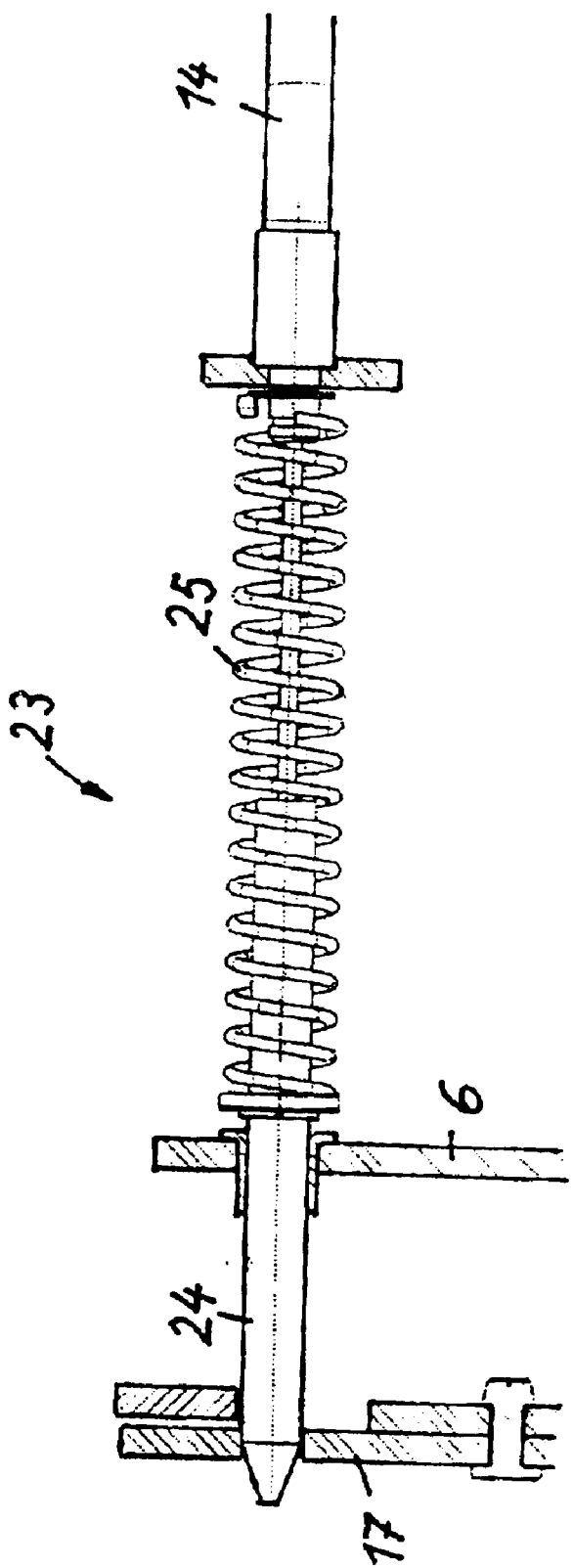
FIG. 5 shows the lacking bolt in a locking position.

FIG. 5 shows the locking structure 23 in detail, including the locking bolt 24 biased by the spring 25 into its locking position. The locking bolt 24 extends through an opening in the wall of the containment bottom 6 and an opening in the wall of the containment bottom operating arm 17 so as to prevent any relative movement between these components.

What is claimed is:

1. A containment for receiving a removable vehicle top (1) including a top containment cover (7), a top containment cover operating mechanism (9) for transferring the vehicle top between closed and open positions, a top containment bottom (6) movable between raised and lowered positions, a top containment bottom operating mechanism (8) for moving the top containment bottom (6) between the raised position corresponding to the closed position of the vehicle top (1) and the lowered position corresponding to the open position of the vehicle top (1), said containment bottom operating mechanism (8) being coupled to the vehicle top (1) in such a way that, during the transfer of the vehicle top (1) from the closed position to the open position, movement of a component (3) of the vehicle top (1) initiates uncoupling of said top containment bottom (6) from said top containment bottom operating mechanism (8).

2. A containment according to claim 1, wherein said top containment bottom operating mechanism (8) is operatively connected to the top containment cover (7) such that an opening movement of said top containment cover (7) causes the uncoupling of the top containment bottom (6) from the top containment bottom operating mechanism (8).

3. A containment according to claim 1, wherein said operating mechanism (8) includes a containment bottom operating arm (17), which is pivotally connected to the containment bottom and a releasable locking bolt (24) is provided for releasably locking the containment bottom (6) to the containment bottom operating arm (17).

4. A containment according to claim 3, wherein said locking bolt (24) is biased into its locking position.

5. A containment according to claim 4, wherein a motion transfer member (14) is arranged between the containment cover (7) and the locking bolt (24).

6. A containment according to claim 5, wherein said motion transfer member is a Bowden cable (14).

7. A containment according to claim 1, wherein said containment bottom (6) is supported so as to be pivotable about a stationary pivot axis (11) and extends essentially vertically when in its raised position and essentially horizontally when in its lowered position.

8. A containment according to claim 7, wherein said containment bottom (6) is biased for movement to its lowered position and an operating member (12) is provided, which is operatively connected to said vehicle top (1) for retaining said containment bottom (6) in its raised position when said vehicle top (1) is in its closed position.

9. A containment according to claim 8, wherein said operating member (12) is connected to a tensioning yoke (3) of said vehicle top (1).

10. A containment according to claim 8, wherein said operating member in a Bowden cable (12).

11. A containment according to claim 1, wherein said containment bottom operating mechanism (8) includes a drive arm (15) for operating said containment operating mechanism (8).

12. A containment according to claim 11, wherein said drive arm (15) is operatively connected to a containment bottom operating arm (17) which is pivotally supported on said containment bottom (6).

13. A containment according to claim 12, wherein an intermediate link (16) is pivotally connected to the drive arm (15) and the containment bottom operating arm (17) and the drive arm (15) and the containment bottom operating arm are so arranged that, in the raised position of the containment bottom (6), the intermediate link (16) and the drive arm are essentially aligned so that essentially no torque is transmitted by the intermediate link (16) to the drive arm (15).

14. A containment according to claim 11, wherein said drive arm (15) is biased by a torsional spring (21) to a containment bottom lowering position.

* * * * *